United States Patent [19]
Beeman et al.

[11] Patent Number: 4,584,696
[45] Date of Patent: Apr. 22, 1986

[54] TRANSMISSION RESPONSE MEASUREMENT

[75] Inventors: Robert H. Beeman, Scottsdale; Paul U. Lind, Phoenix, both of Ariz.

[73] Assignee: GTE Communication Systems Corporation, Northlake, Ill.

[21] Appl. No.: 664,621

[22] Filed: Oct. 25, 1984

[51] Int. Cl.$^4$ .............................................. H04B 1/10
[52] U.S. Cl. ...................................... 375/99; 333/18; 328/175; 375/12
[58] Field of Search ........................... 375/99, 101, 12; 328/175, 162; 333/17 R, 18; 364/571

[56] References Cited

U.S. PATENT DOCUMENTS

| | | | |
|---|---|---|---|
| 3,621,139 | 11/1971 | Gibson | 375/101 |
| 4,012,628 | 3/1977 | Gersho | 375/12 |
| 4,250,472 | 2/1981 | Hashimoto | 333/18 |

Primary Examiner—Marc E. Bookbinder
Assistant Examiner—M. Huseman
Attorney, Agent, or Firm—Charles A. Doktycz

[57] ABSTRACT

A circuit arranged to measure and correct for transmission line induced disturbances at discrete intervals after receipt of a header pulse by recording the presence of any voltage deviating from a set level. These levels are registered and during receipt of the data pulses are utilized at times corresponding to the relative position of the preceding data pulses to modify subsequent data bits.

20 Claims, 13 Drawing Figures

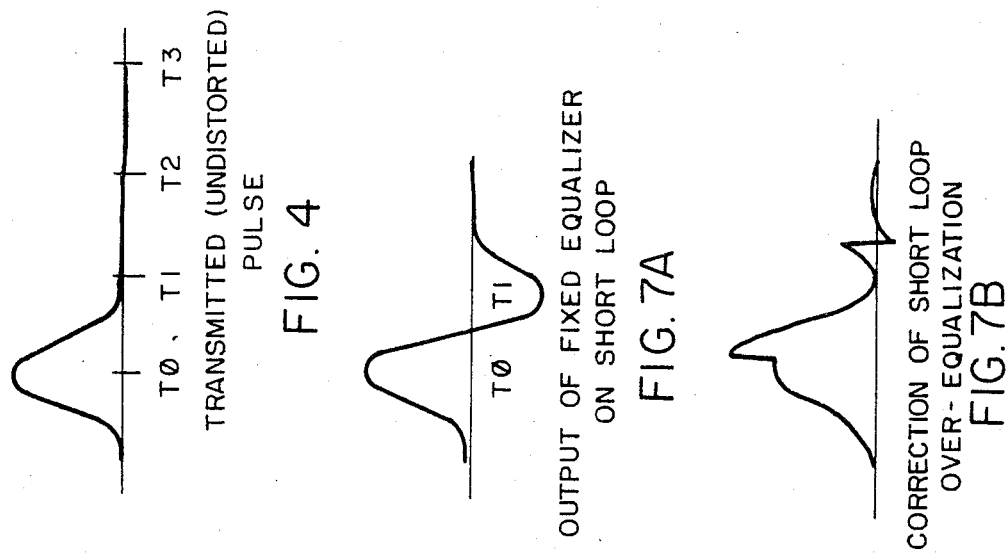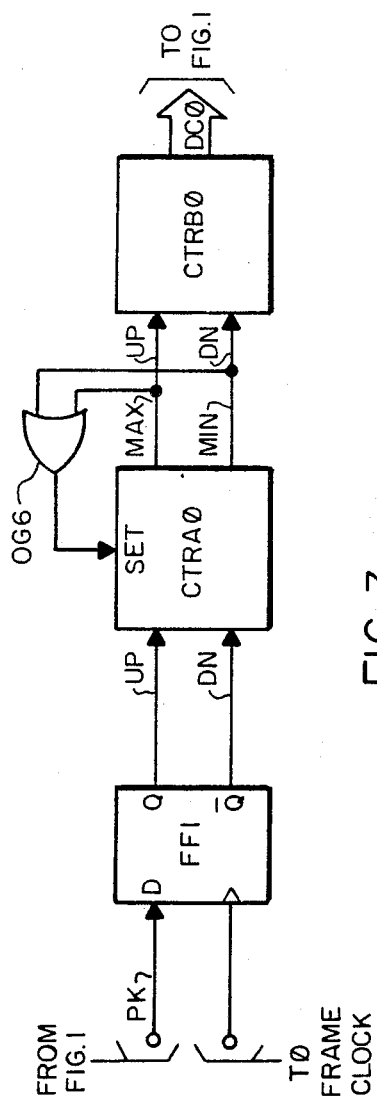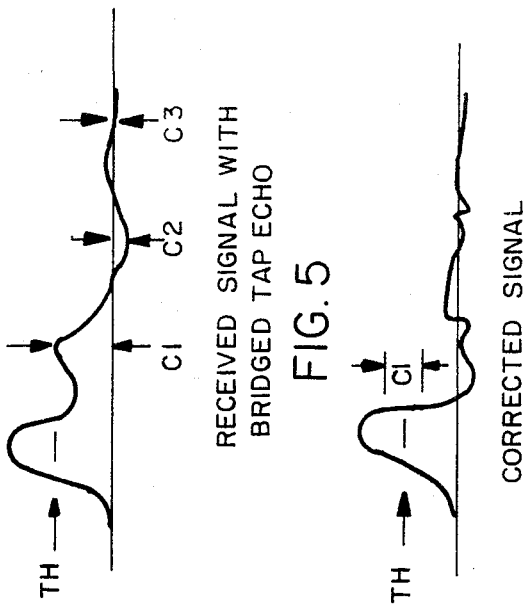

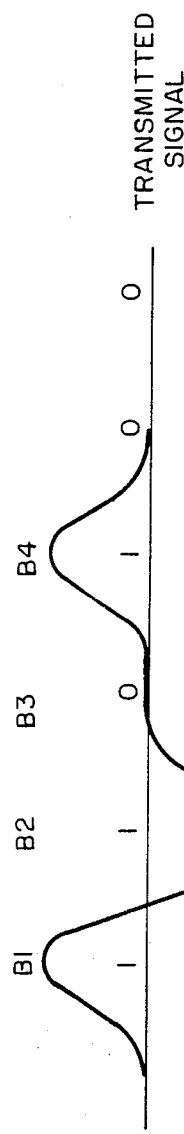
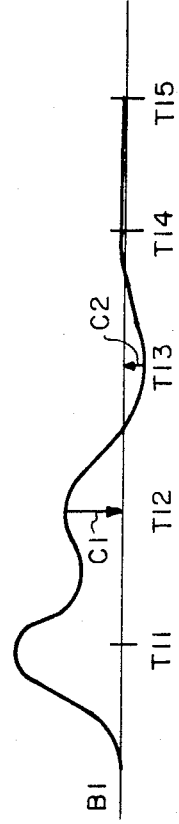
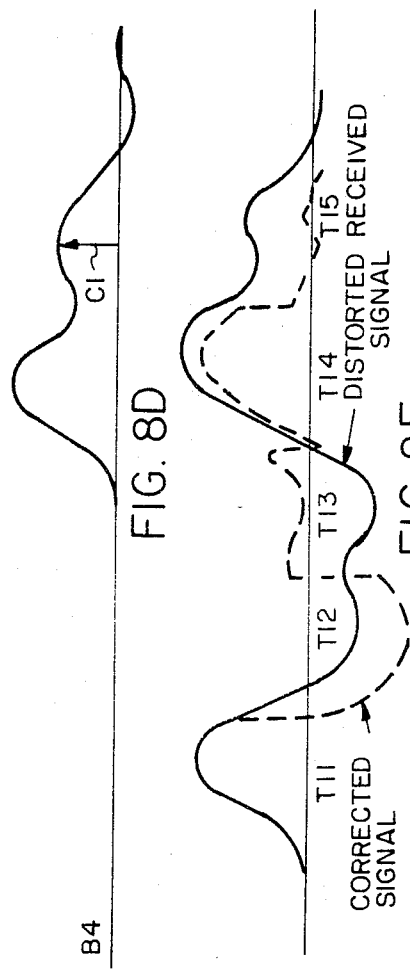

TRANSMISSION RESPONSE MEASUREMENT

CROSS-REFERENCE TO RELATED APPLICATIONS

Patent applications Ser. No. 664,662 entitled "Pulse Height Determination Arrangment" and Ser. No. 664,623 entitled "Dynamic Digital Equalizer" each in the names of R. H. Beeman and P. U. Lind filed concurrently herewith on related subject matter and assigned to the same assignees as the present invention.

FIELD OF THE INVENTION

This invention relates to a method of transmitting digital information and more particularly to a digital equalizer used to receive bursts of high speed data pulses transmitted over ordinary two-wire twisted pair subscriber telephone loops.

BACKGROUND OF THE INVENTION

Existing digital transmission equipment using telephone pairs requires the removal of bridged-taps on the pair to be used if the taps exceed a certain individual or cumulative length. The allowed length of tap depends on the transmission bit-rate and the velocity factor of the cable used, and is chosen to make the pulse distortion due to echoes small compared to both the height and width of the pulses themselves, and the distortion introduced by the cable pair minus taps. Unfortunately, the Serving Area Concept now used for providing telephone loops virtually guarantees that bridged-taps will be present on typical lines. Removal of these taps from all lines used for providing digital service will become increasingly impractical as the number of subscribers requiring digital service continues to grow.

Automatic equalizers (or Automatic Line Build Out Networks - ALBO) which work properly on pairs without bridged-taps do exist. These are widely used on T-carrier lines which carry continuous, rather than bursted, streams of pulses. ALBO,s work by detecting the average pulse height using a rectifier and filter arrangement and then using the detected height to adjust the gain of an AGC amplifier and the frequency response of a controllable equalization network. The gain and frequency-response adjusted pulses are then applied to the data detectors, usually consisting of one or more comparators. This method requires an initial knowledge of the relationship between received pulse, height and equalization settings. This knowledge is designed into the ALBO initially and therefore limits the ALBO to use on pairs which have a loss vs. frequency response characteristic close to the one assumed. Any frequency domain filtering used to control interference at either the sender or receiver must be explicitly accounted for in the ALBO design. Any change in the transmitter output level causes equalization errors at the receiver, which interprets level changes as reflecting only loop losses. Finally, since reflections from bridged-taps and gauge changes produce frequency-domain changes which are both more complex than those caused by the loop itself and not sensibly related to the loss which they cause, ALBO type arrangements are inherently incapable of correcting pulse distortion from these causes.

A further difficulty with existing equalizers results from the methods used to extract timing from the incoming data pulses. In T-carrier systems, where a continuous pulse stream is available, the zero-crossings of either the equalized or unequalized pulses are used to shock-excite a resonator (i.e., a tuned circuit, quartz crystal, etc.) which rings at its resonant frequency, equal to the intended pulse rate or a multiple. The resulting "ringing" of the resonator produces the clock signal for the data recovery. Due to the limited resonator "Q," this method requires a pulse stream with some minimum density of zero crossings and no lengthy gaps. It is therefore unsuitable for "ping-pong" or TCM use because the gaps in the data required to implement full-duplex transmission are too long to maintain "ringing" in the resonator. An additional problem is that equalization errors or echoes can cause jitter and long-term errors in the clock phase, resulting in non-optimum sampling of the pulses.

Another method of timing recovery uses a free-running crystal-controlled clock at some multiple of the bit rate. When zero-crossings occur in the data, a determination is made as to whether the zero-crossing was early or late and the clock phase is adjusted in the same direction. This method permits bridging of gaps between bursts of pulses, but still allows timing errors due to equalization errors or echoes.

One attempt to overcome the limitations of ALBO type equalization is called a "Decision Feedback Equalizer." In this method it is assumed that the received bit pattern is approximately right, and for each possible combination of previous bits (for example the 3 bits just past) a record is kept of whether the zero-crossing immediately following was early or late. The early or late status of the zero-crossing is assumed to carry information about whether the immediately preceding bit was rendered higher or lower in amplitude than it should have been by the cumulative effect of the preceding bits. Alternatively, the height of each bit could be measured directly and correlations developed from these measurements. The results of the correlations are used as a correction to each bit so that the threshold level used for detection of a given bit depends on the preceding bits. Unfortunately, this method of equalization does little to correct timing jitter induced by equalization errors. It is also subject to timing and equalization errors due to patterns in the data bits. Worst of all, it creates a feedback loop in which the equalization parameters are derived from the bits being equalized, causing potential stability problems.

SUMMARY OF THE INVENTION

The Transmission Response Measurement and Equalization requires that each burst of pulses transmitted be preceded by an interval of silence long enough for previous pulses to have died away. The burst of pulses begins with a special "header" consisting of a single sync pulse followed by an interval of silence sufficient to allow the responses to the sync pulse to die out. After the header, the data pulses are sent.

This circuit obtains its timing and gain information from looking at the sync pulse at the beginning of the header. Since this pulse was preceded by a substantial period of silence, it is not corrupted by the effects of previous pulses. Furthermore, since echoes caused by bridged-taps and gauge changes are always delayed, the first half of the sync pulse is uncorrupted by these effects. Thus, the true pulse amplitude can be measured by the height of the sync pulse. A comparator set at half the peak value of the sync pulse will indicate the 50% leading edge timing and can be used to adjust the phase of free-running crystal clock to agree with the leading edge of the pulse. Determination of the pulse timing and amplitude by the average of the sync pulses from many bursts allows accurate tracking of both in spite of noise and occasional errors.

Once the pulse amplitude and timing has been determined and the first sample instant set at approximately one-fourth bit internal after the leading edge of the sync pulse, the process of equalization adjustment begins. The circuitry does not measure any signal at the sample instants following the sync pulse and, therefore, any non-zero signals measured at these sample instants are due to imperfect equalization of the sync pulse. An average of many such readings for each sample point following the sync pulse gives an accurate measurement of the response of the entire system to the pulse. The response includes the loop and all its impairments as well as any filtering in the transmitter or receiver. After each header is finished, the circuit switches from the adjustment mode to the equalization mode. In the equalization mode an account is kept of past data pulses and their individual contributions to the distortion of following pulses, as determined in the adjustment mode. In this way the detection threshold for each data bit is "warped" or "biased" by the sum of the distortion components from previous pulses. Alternatively, the correction voltage can be subtracted from the received signal itself before detection. This circuit has only one designer-enforced assumption about the interactions between bits, namely the number of bit intervals required for the "tail" of a given bit to drop off to insignificance. This allows filters, bridged-taps, different types of wire, etc. to be used or mixed in any combination without any need to change design parameters of this circuit. Such changes are automatically compensated for by the adjustment mode.

Another significant advantage of this circuit over other automatic equalizers is that there are no feedback loops tying data bits to adjustment. When this circuit is in the adjustment mode it is only adjusting—not equalizing. When it is in the equalization mode it is only equalizing—not adjusting. All timing is derived from the sync pulse and is therefore independent of data. This separation of functions eliminates instabilities caused by periodicities and patterns in the data bits, since they cannot affect the adjustment.

BRIEF DESCRIPTION OF THE DRAWINGS

The above mentioned objects and other features of the invention and the manner of obtaining them will become more apparent, and the invention itself will be better understood by reference to the following description of an embodiment of the invention taken in conjunction with the accompanying drawings in which:

FIG. 3 shows in schematic form the amplitude logic block AL of FIG. 1.

FIGS. 4, 5 and 6 show respectively the waveform of an undistorted pulse, a received pulse and the same pulse form after correction.

FIGS. 7A and 7B show the waveform of the output of a fixed equalizer on a short loop and the resultant over equalization.

FIGS. 8A-8E show the waveforms of transmitted signal components of the signal and the resultant distorted and corrected signals.

DESCRIPTION OF THE PREFERRED EMBODIMENT

Figure 1:
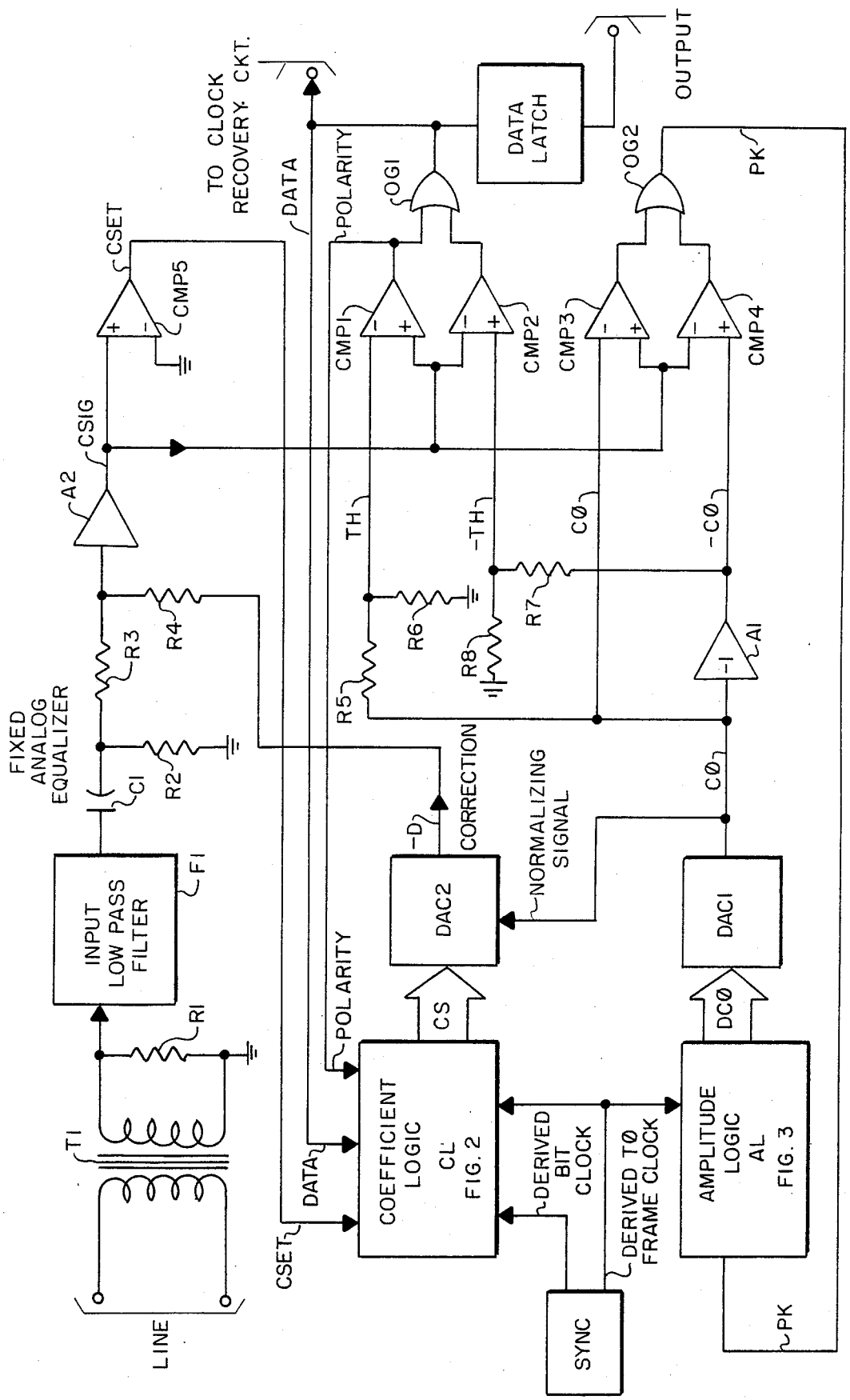
FIG. 1 shows in partial block diagram form the functional circuit configuration of the Dynamic Digital Equalizer.

As stated, adjustment of the equalizing parameters is done only during a header. However, in this invention the adjustment mode uses the same circuitry used to correct the data pulses in the data mode. In the preferred embodiment, the correction voltage is subtracted from the signal to form a corrected signal. Since the signal is supposed to be zero following a sync pulse, the process of adjustment consists of finding correction voltages which force the corrected signal to zero at discrete bit times following the sync pulse. These correction voltages will be called coefficients and are subsequently used in the equalization mode to correct the signal following any "1" bit.

FIG. 4 shows a transmitted header sync pulse which rises to a peak at time T0 and falls to zero at T1, the next bit time. FIG. 5 shows how the same pulse might appear at the receiving end of a cable having echoes. The voltage values C1, C2 and C3 will be referred to as coefficients, and are measured precise times of subsequent bits. The large echo at time T1 must be corrected to prevent it from causing erroneous detection of a bit at that time. Correction occurs even during the header as shown in FIG. 6 where the coefficients are subtracted from the signal. Adjustment is carried out during each header, each coefficient being successively increased and decreased by trial and error until it forces the corrected sync pulse to zero at times T1, T2 or T3 as shown in FIG. 6. There it can be seen that a voltage equal to C1 is subtracted from the signal shortly after time T0 to bring the corrected signal to zero at T1. Similarly prior to T2 and T3, coefficients C2 and C3 are subtracted to bring the signal to zero.

In real cable the non-zero echo distortion following any bit affects approximately three subsequent bits. At any given time in a data stream, the correction voltage is not only the C1 value of the preceding bit, but is the sum of three voltages. These are C1 times the preceding bit, C2 times the second bit preceding, and C3 times the third bit preceding. If a 0-bit occurs at any of these preceding times, its zero value causes that coefficient to be dropped from the sum since a "0" bit has no echoes.

The process of correcting echoes in a string of bits is illustrated in FIGS. 8A-8E where a Bipolar Alternate Mark Inversion (BAMI) code of 110100 was sent. The distorted received signal is shown by the solid portion of the curve in FIG. 8E and is known to be the linear superposition of separate "1" pulses shaped like the isolated received sync pulses. These separate components are shown in the curves of FIGS. 8B, 8C and 8D. Having just measured the sync pulse coefficients we know that the value of C1 is large and positive, the value of C2 is small and negative and the value of C3 is zero. The curve at 8B shows this with arrows indicating the amount and direction of correction needed Since no bits immediately preceded this string, no correction is necessary at time T11 Only one coefficient C1 from the first bit affects the received signal at time T12 where the signal is not nearly negative enough for a −1 BAMI pulse. Therefore prior to T12 the sum contains C1 from bit B1 which is subtracted from the signal to make it more negative as shown by the dashed curve of FIG. 8E. At time T13 the signal should have been zero but is much too negative because of the small negative C2 from bit B1 and the large and inverted C1 echo from negative pulse B2. Bit B2 is detected as a negative pulse, therefore its large positive coefficient C1 is subtracted from the correction sum rather than added. Prior to time T13 a negative sum (C2−C1) is subtracted from an already negative received signal to bring the corrected (dashed) signal of FIG. 8E to zero as sent.

At time T14 the received signal is slightly high due to the single small C2 coefficient of bit B2. This is subtracted prior to time T14 to bring the pulse height back to normal. This bit, B4, is preceded by a "0," so the main disturbance at the next bit time, T15, is caused by the C1 coefficient of bit B4 which is subtracted from the signal.

It can be seen that the dashed curve in FIG. 8E looks much more like the transmitted signal and will yield correct bit detections at the particular detection times T11 through T15. Had correction not been applied, bit B2 probably would not be detected, and an erroneous bit would be detected during the zero period at T13.

This invention corrects echo distortion as described above, and also simultaneously corrects (equalize) amplitude attenuation and delay distortion. Delay distortion manifests itself as a long decay tail following a pulse. It is the result of low frequency components being attenuated less and delayed more than high frequencies by the cable medium. Long cables of about 45 dB midband attenuation cause decay tails at least 10 bits long. These could be corrected by including many coefficients in the running sum which makes up the correction voltage, or by including a variable automatic line build out ALBO circuit at the input. However, in this invention the number of coefficients required is much lower because fixed analog equalization is included to greatly boost the high frequencies. As a result the signal is greatly over-equalized on a short loop and exhibits overshoot as shown in FIG. 7A. This overshoot is handled by the present circuit as a large negative C1 coefficient at time T1, just as if it were caused by a shorted stub. This is actually advantageous, since bridged taps on such a loop reduce this overshoot. This is because bridged-taps are always open circuits and cause an echo having the same polarity as the signal. Thus it can be seen that the bridged-tap echo cancelling portion of this invention corrects for both echo distortion and cable delay distortion, eliminating the need for an ALBO.

This invention also eliminates the need for an analog AGC circuit at its input, but still handles signal attenuation over a 50 dB range. To do this, another coefficient C0 is measured which is the sync pulse amplitude. As described later, this C0 amplitude is digitized to an equivalent of 12 bits accuracy by successive approximation and stored in register CTRB0 of the amplitude logic AL. To replace the AGC function, the digital C0 number is converted to an analog signal of half that value and is called TH. Signal TH becomes the bit detection threshold of the data comparators by being connected to the reference inputs of these comparators. Thus, small signals have a correspondingly small detection threshold. Equally important is the fact that this threshold is always in the same relative position on the leading edge of a sync pulse, regardless of its steady state amplitude. This provides an accurate timing reference for the associated clock recovery circuitry.

FIG. 1 is an overall block diagram. It includes blocks "Coefficient Logic" CL and "Amplitude Logic" AL which are shown in more detail in FIGS. 2 and 3 respectively. In FIG. 1 the line signal is received by coupling transformer T1 and passes through a low pass filter F1 which removes the high frequency interference. The signal then passes through the fixed equalizer, an RC high pass filter consisting of capacitor C1 and resistor R2. After fixed analog equalization, the signal is summed at amplifier A2 with the already inverted correction voltage, −D from the digital to analog converter DAC2, causing the correction to be subtracted from the signal. The corrected signal CSIG then drives five comparators CMP1-5. Comparators CMP1 and CMP2 are the BAMI data detectors having their reference inputs connected to TH and −TH. Comparators CMP3 and CMP4 are used for determining the peak signal value, having the analog sync pulse amplitude value of C0 and −C0 applied to their reference inputs and their outputs "ORed" to become signal PK. The fifth comparator, CMP5 is used at the times T1, T2 and T3 following a sync pulse to update the coefficients. Its reference input is tied to ground, and comparator CMP5's output is an indication (to FIG. 2) of how well the correction process has corrected the sync pulse.

The digital sync pulse height DC0 is measured and stored in FIG. 3 and output on an 8 bit bus labeled DC0. Digital to analog converter DAC1 is a companding converter, in the preferred embodiment, giving an analog output representation C0 of the peak amplitude to 12 bits equivalent resolution. Inverting amplifier A1 produces a negative C0 signal so that negative going sync pulses may be measured by successive approximation using comparator CMP4. The operation of the amplitude measuring circuit AL shown in greater detail in FIG. 3, is as follows: Input leads to FIG. 3 are the lead labeled PK, which is the OR from gate OG2 of the output of the peak comparators CMP3 and CMP4, and a derived frame clock signal from associated sync circuitry. The frame clock pulse edge occurs in the middle of the incoming sync pulse. If, at the time of the frame clock pulse edge, a sync pulse of positive polarity exceeds the level of +C0 signal, or a negative sync pulse is more negative than the level of −C0 signal, one of the comparators CMP3 or CMP4 produces an output on lead PK causing flip-flop FF1 shown in FIG. 3 to be set. The Q output of flip-flop FF1 causes the counter CTRA0 to count up once. This is a 4 bit up/down counter and is used for averaging and presets itself to a middle value of 8 each time a minimum count of 0 is reached counting down or maximum of 15 is reached when counting up. In this example, if several consecutive sync pulses exceed the level of the C0 signal, CTRA0 counts up to 15 and causes up/down counter CTRB0 to count up once. Counter CTRB0 holds the 8 bit digital amplitude value DC0, which is the absolute (unsigned) amplitude value tracking the sync signal peak. This sequence repeats until the binary value in counter CTRB0 increases to the point where the digital to analog converter DAC1 produces an analog voltage signal C0 greater than the sync signal peak and neither comparitor CMP3 or CMP4 gives an output during the sync pulse. Then, at subsequent sync times, counter CTRA0 will count down and cause the binary number of signal DC0 to decrease every eighth time signal C0 exceeds the sync signal pulse height, until the sync signal again exceeds signal C0. Thus, the value of signal DC0 and its analog counterpart signal C0 from the digital to analog converter DAC1 will slowly toggle between two values, one slightly larger and one slightly smaller than the sync signal pulse height. In this way the threshold signal TH, which is half the value of signal C0, will accurately remain at one half the voltage of the sync signal peak for the proper detection at any average signal strength.

Figure 2:
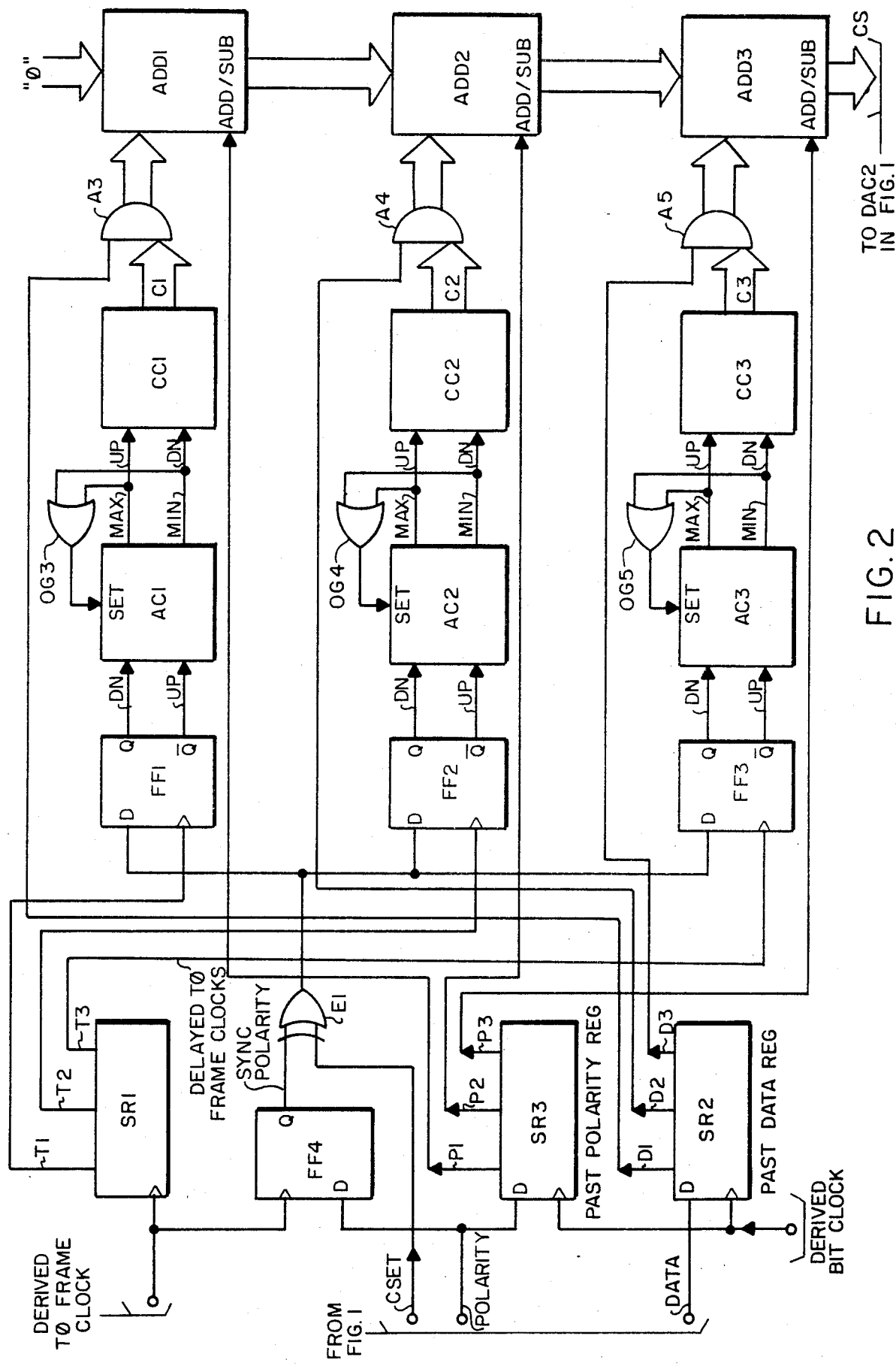
FIG. 2 shows in schematic form the coefficient logic block CL of FIG. 1.

FIG. 2 is a schematic diagram of the circuitry which measures the coefficients and adds them to form the correction voltage −D at the output digital to analog converter DAC2 output in FIG. 1. The coefficients C1, C2 and C3 of FIGS. 5, 6 and 9 are assigned binary numbers of only 4 bits (plus a sign) accuracy, and are stored in up/down counters. They are also determined by successive approximation from the isolated sync pulse in exactly the same way C0 is determined with one exception. In FIG. 1, the coefficient sum is first subtracted from the signal and then compared in comparator CMP5 with zero volts. In the case of C0 and −C0, those signals were compared directly with the signal at a time T0 when the coefficient sum was forced to zero. That is, it is the purpose of C0 to set a threshold and not affect the signal, where as the coefficient sum must modify the signal itself, forcing it to zero after isolated 1 bits and correcting the shape of adjacent bits.

Referring to FIG. 2, shift register SR2 stores the last 3 detected data bits, and SR3 stores their corresponding BAMI polarities. Immediately following time T0 in each frame, signal D1 contains a "1" from the sync bit and P1 contains its polarity. D2, D3, P2 and P3 are zero because these registers were reset just prior to the sync bit. At this time in each frame, signal D1 enables gate A3 to pass the 5 bit contents of up/down counter CC1 to adder ADD1. The other input port of ADD1 is wired to zero, and if the sync pulse had been a positive "1", input P1 of adder ADD1 would instruct this adder circuit to add rather than subtract the input (from 0). At this time (shortly after time T0) signals D2 and D3 are zero, forcing 5 bit zero codes from gates A4 and A5 to appear at the inputs to adders ADD2 and ADD3. Thus the sum from ADD1 ripples through adders ADD2 and ADD3 forming coefficent sum CS consisting only of C1, or negative C1 if the sync polarity had been negative. The CS sum is presented to digital to analog converter DAC2 in FIG. 1, subtracted from the analog signal, and the resultant CSIG signal is compared with zero volts by CMP5. Assuming that a distorted signal as in FIG. 5 were received just prior to T1, and assuming that C1 has a low starting value in FIG. 2, then the corrected signal CSIG (in FIG. 1) will be undercorrected and CMP5 will output a "1" signal on lead CSET. This "1" signal in combination with the flip-flop FF4 "1" signal on Q input causes exclusive OR gate E1 to output a "zero" which is latched in FF1 at time T1 as an indication that coefficient C1 was too low, causing up/down counter AC1 to count up once. If this happens in 7 consecutive frames at time T1, counter CC1 is incremented once to increase coefficient C1. This repeats until the C1 coefficient being subtracted in FIG. 1 causes the signal at time T1 to be slightly negative and CMP5 outputs a "zero." CSIG then appears similar to the waveform in FIG. 6. The "zero" on lead CSET, assuming a positive sync signal, causes E1 to output a "1" which is latched in FF1 at time T1 as an indication that C1 is too high. Counter CC1 is decremented if this happens 8 times in a row at time T1. Thus, the value of counter CC1 toggles between two values which cause the corrected sync pulse on lead CSIG to be slightly positive and slightly negative at time T1.

The same procedure is used to set coefficients C2 and C3 in counters CC2 and CC3. In those cases the 1-bit from the sync pulse moves to locations D2 and D3 of SR2. Just prior to time T2 only D2 is a "1" and only C2 is permitted to contribute to the adder sum CS because AND gate A4 above is enabled. Therefore coefficient C2 is adjusted to bring the corrected analog signal CSIG to zero, at time T2. Adjustment of coefficient C2 can happen only at time T2 when FF2 latches the result of the CSIG offset as determined by CSET and sync polarity inputs to gate E1. In exactly the same manner C3 is adjusted at time T3. The bit times T1, T2 and T3 are obtained from register SR1 in response to deriver T0 indication from the sync circuit of FIG. 1.

It should be noted that the sync pulse may be transmitted with random polarity without affecting circuit operation. In the foregoing example adjusting C1 from a low initial value, a negative sync pulse would have produced a negative echo at time T1 and a "0" signal on lead CSET. However, the sync polarity signal from FF4 in FIG. 2 would have also been a zero causing E1 to again output a "1" as in the example. Also, the coefficients themselves and sum CS may be negative. These are 5 bit signed binary numbers in 2's complement form where code 11111 equals −1 in the counters (CC1 etc.) and in the adders (ADD1 etc.), The coefficients are stored as if they resulted from a positive going 1-bit. If a data pulse is negative, its coefficients are inverted (regardless of their original sign) within the adders to cause their subtraction from the sum. This is accomplished by the special ADD/SUBTRACT input control on each adder driven by the bit polarity leads P1, P2 and P3. As an example, bit B2 in FIG. 8 is negative. It contributes an inverted C1 coefficient prior to T13.

The coefficients and sum CS are all relative, or normalized, to the C0 pulse height because the multiple input of DAC2 is connected to C0 so that the maximum correction code on CS produces "−D" equal to the current sync pulse height. Signal −D could actually be scaled to be any proportion of C0 depending on the amount of analog equalization used and realistic cable conditions. This normalization of coefficients is important because it allows a small number of bits to digitally correct a distorted signal of any amplitude. The maximum code on CS always produces a correction voltage equal to the sync pulse height regardless of how great this height may be. There are always 15 positive and 16 negative steps of resolution available for correction voltage −D between the values of plus and minus the sync pulse height.

We claim:
1. An arrangement for the recovery of digital data from an incoming data stream where such data is preceded by a single sync pulse header and comprising:
receiving means for receiving an incoming digital signal and having an output for connection to other circuits, said receiving means including an amplifier operatively connected to a comparison means, to amplify an incoming signal, said comparison means operated to produce a set signal upon detecting any voltage deviation from a set comparison level, a first, a second and a third register means operated to register each occurrence of said set signal occurring respectively at a first, a second or a third discrete bit time after said sync pulse,
a first connect means operatively connecting said set signal to said registers,
a frame clock pulse source operated to output an enabling signal to said registers to indicate said respective first, second, and third bit times following said sync pulse, first, second and third gate means respectively, operatively associated with said register means and operative to pass said register contents, and first, second and third arithmetic means connected in tandem and respectively, operatively connected to receive said respective register content via said respective gate means said third arithmetic means providing a summed digital count, digital to analog converter means operatively connected to said third arithmetic means to receive said summed digital count and connert said count to an analog level, said analog level inputted to said amplifier to correct said receiving means output.

2. In an arrangment as claimed in claim 1, wherein each said first, second and third register means includes digital counter means and a flip-flop operated in response to said set signal to increment said digital counter means, and operated in response to said frame clock pulse source to decrement said digial counter means in the absence of said set signal during the receipt of a sync pulse.

3. In an arrangement as claimed in claim 2, wherein said digital counter means comprises a first 4 bit up-down and a second up-down counter, whereby said second counter is incremented or decremented only once for each time said first counter reaches a count of 15 or 0 respectively.

4. In an arrangement as claimed in claim 1, further including a data register operatively connected to record the presence or absence of a data bit at a particular relative sequential time, said data register having outputs connected to operatively control said gate means to transfer said corresponding register contents to said arithmetic means.

5. In an arrangement as claimed in claim 2, further including a data register operatively connected to record the presence or absence of a data bit at a particular relative sequential time, said data register having outputs connected to operatively control said gate means to transfer said corresponding register contents to said arithmetic means.

6. In an arrangement as claimed in claim 3, further including a data register operatively connected to record the presence or absence of a data bit at a particular relative sequential time, said data register having outputs connected to operatively control said gate means to transfer said corresponding register contents to said arithmetic means.

7. In an arrangement as claimed in claim 4, further including a signal polarity register operatively connected to record the polarity of any data bit registered in said data register at a particular relative sequential time, said data register having outputs connected to operatively control said arithmetic means to correspondingly add or subtract said data transferred via said gate means.

8. In an arrangement as claimed in claim further including a polarity register operatively connected to record the polarity of any data bit registered in said data register at a particular relative sequential time, said data register having outputs connected to operatively control said arithmetic means to correspondingly add or subtract said data transferred via said gate means.

9. In an arrangement as claimed in claim 6, further including a polarity register operatively connected to record the polarity of any data bit registered in said data register at a particular relative sequential time, said data register having outputs connected to operatively control said arithmetic means, to correspondingly add or subtract said data transferred via said gate means 10. In an arrangement as claimed in claim 1, wherein said gate means comprises an AND gate.

11. In an arrangement as claimed in claim 2, wherein said gate means comprises an AND gate.

12. In an arrangement as claimed in claim 3, wherein said gate means comprises an AND gate.

13. In an arrangement as claimed in claim 1, wherein said receiving means further includes an analog input filter.

14. In an arrangement as claimed in claim 3, wherein said receiving means further includes an analog input filter.

15. In an arrangement as claimed in claim 4, wherein said receiving means further includes an analog input filter 16. In an arrangement as claimed in claim 7, wherein said receiving means further includes an analog input filter.

17. In an arrangement as claimed in claim 1, wherein said receiving means further includes a fixed analog signal equalizer.

18. In an arrangement as claimed in claim 3, wherein said receiving means further includes a fixed analog signal equalizer.

19. In an arrangement as claimed in claim 4, wherein said receiving means further includes a fixed analog signal equalizaer.

20. In an arrangement as claimed in claim 7, wherein said receiving means further includes a fixed analog signal equalizer

* * * * *